(12) United States Patent
Ollesson et al.

(10) Patent No.: US 11,438,542 B2
(45) Date of Patent: Sep. 6, 2022

(54) METHOD FOR CONTROLLING READ-OUT FROM A DIGITAL IMAGE SENSOR

(71) Applicant: Tobii AB, Danderyd (SE)

(72) Inventors: Niklas Ollesson, Danderyd (SE); Magnus Ivarsson, Danderyd (SE); Viktor Åberg, Danderyd (SE); Anna Redz, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/906,228

(22) Filed: Jun. 19, 2020

(65) Prior Publication Data
US 2021/0014443 A1   Jan. 14, 2021

(30) Foreign Application Priority Data
Jun. 19, 2019   (SE) .................................... 1950759-9

(51) Int. Cl.
| | |
|---|---|
| *H04N 7/18* | (2006.01) |
| *H04N 5/378* | (2011.01) |
| *G06T 7/20* | (2017.01) |
| *H04N 5/345* | (2011.01) |
| *H04N 5/347* | (2011.01) |
| *H04N 5/353* | (2011.01) |

(52) U.S. Cl.
CPC .............. *H04N 5/378* (2013.01); *G06T 7/20* (2013.01); *H04N 5/347* (2013.01); *H04N 5/3456* (2013.01); *H04N 5/3532* (2013.01); *G06T 2207/30201* (2013.01)

(58) Field of Classification Search
CPC ...... H04N 5/347; H04N 5/235; H04N 5/2351; H04N 5/2353; H04N 5/243; H04N 5/335; H04N 5/341; H04N 5/378; H04N 5/2256; H04N 5/332
USPC .......................................................... 348/78
See application file for complete search history.

(56) References Cited

U.S. PATENT DOCUMENTS

| | | | |
|---|---|---|---|
| 2006/0113459 A1* | 6/2006 | Yang ...................... | H04N 5/347 250/208.1 |
| 2007/0102622 A1* | 5/2007 | Olsen .................... | G02B 13/009 250/208.1 |
| 2014/0160330 A1* | 6/2014 | Geisler .............. | H04N 5/37206 348/295 |

(Continued)

*Primary Examiner* — Masum Billah
(74) *Attorney, Agent, or Firm* — Kilpatrick Townsend & Stockton LLP (57) ABSTRACT

A computer implemented method for controlling read-out from a digital image sensor device, comprising a plurality of pixels, the method comprising the steps of setting a first read-out scheme, based on a first level of pixel binning and/or pixel skipping, reading, based on the first read-out scheme, from the digital image sensor device, a first image, determining an exposure value for the first image, based on the intensity value of each one of the first plurality of regions of the first image and comparing the exposure value with a predetermined maximum value. A second read-out scheme based on a second level of pixel binning and/or pixel skipping is set. The level of pixel binning and/or pixel skipping in the second read-out scheme is increased compared to the first read-out scheme, if the exposure value is higher than the predetermined maximum value. Based on the second read-out scheme, a subsequent second image is read. A system configured to perform the method is also described.

13 Claims, 4 Drawing Sheets

(56) References Cited

U.S. PATENT DOCUMENTS

2016/0028985 A1* 1/2016 Vogelsang .............. H04N 5/347
  348/294
2017/0316264 A1* 11/2017 Gustafsson ............. G06F 3/013

* cited by examiner

METHOD FOR CONTROLLING READ-OUT FROM A DIGITAL IMAGE SENSOR

CROSS REFERENCE TO RELATED APPLICATIONS

This application claims priority to Swedish Application No. 1950759-9, filed Jun. 19, 2019; the content of which are hereby incorporated by reference.

TECHNICAL FIELD

The present invention relates to a method for controlling read out from a digital image sensor. The invention also relates to a system comprising a digital image sensor, wherein the system is configured to control the read-out from the image sensor using the method. Further, the invention relates to a computer program for carrying out the method.

BACKGROUND ART

Digital image sensors are widely used in different areas of technology for capturing images. For some applications, such as in systems configured for face recognition and eye tracking, the complexity, and thus also the cost, of the image sensor and the electronics related to it should be kept at a low level.

A first type of digital image sensor is configured with a global shutter and configured for global reset. This means that all pixels in the sensor are exposed simultaneously and reset simultaneously. This type of digital image sensor functions well for most applications but is relatively expensive making it unsuitable for face recognition and eye-tracking applications. A second type of sensor is configured with a rolling shutter and configured for global reset. This means that is the sensor reads one pixel at a time and resets all pixels simultaneously. This type of sensor introduces the problem with the exposure as the last lines of the matrix that are read are exposed for a longer time. This may lead to problems with overexposure and underexposure of pixels in the image.

SUMMARY OF THE INVENTION

An object of the present invention is to provide a computer implemented method and a computer program for controlling a digital image sensor device, comprising a plurality of pixels, such that the image read from the image sensor device is dynamically adapted to the ambient light.

Another object of the present invention is to provide a computer implemented method and a computer program for controlling a digital image sensor device, comprising a plurality of pixels, such that read-out is performed in such a way that saturation and/or underexposure of the image is avoided.

Another object of the present invention is to provide a system comprising a processor and a digital image sensor device, wherein one of the above objects is achieved.

At least one of these objects is achieved with a computer implemented method, a computer program and a system according to the independent claims.

Further advantages are achieved with the features of the dependent claims.

According to a first aspect of the present invention, a computer implemented method is provided for controlling read-out from a digital image sensor device, comprising a plurality of pixels. The method comprises the steps of setting a first read-out scheme, defining a first plurality of regions to be read based on a first level of pixel binning and/or pixel skipping, and reading, based on the first read-out scheme, from the digital image sensor device, a first image, comprising an intensity value of each one of the first plurality of regions of the first image. The method further comprises the steps of determining an exposure value for the first image, based on the intensity value of each one of the first plurality of regions of the first image, comparing the exposure value with a predetermined maximum value, setting a second read-out scheme defining a second plurality of regions to be read based on a second level of pixel binning and/or pixel skipping, wherein the level of pixel binning and/or pixel skipping in the second read-out scheme is increased compared to the first read-out scheme, if the exposure value is higher than the predetermined maximum value; and reading, based on the second read-out scheme, from the digital image sensor device, a subsequent second image, comprising an intensity value of each one of the second plurality of regions of the second image.

Pixel binning is a technique according to which a number of adjacent pixels in a region are read simultaneously. The resulting intensity value for the region is an average of the individual pixel values. Pixel skipping is a technique according to which only one pixel in a region is read while the other pixels in the region are not read. The intensity value for the region is in this case the pixel value of the pixel that is read.

The method according to the first aspect of the invention enables dynamic adaptation of the exposure of the image to different intensities of the ambient light. When increasing the level of binning skipping and/or skipping the readout time is decreased. The method is particularly advantageous for digital image sensor devices configured with a rolling shutter and global reset. With such digital image sensor devices all pixels are reset simultaneously. After the reset all pixels are exposed. Rolling shutter means that the pixels are read subsequently while the pixels are still exposed. The read-out takes time and during the read-out of the pixels the exposure continues. This means that the rows are exposed during different exposure times. It is possible to adapt the digital amplification and any lens in front of the digital image sensor such that the exposure is acceptable for a certain intensity of the ambient light. However, when the ambient light increases, for example when the digital image sensor device is moved outdoors, some of the pixels might be saturated. The present invention takes care of this problem by determining an exposure value, comparing the exposure value to a predetermined maximum value and increasing the level of pixel binning and/or pixel skipping if the exposure value is too high. When the level of pixel binning and/or pixel skipping is increased the read-out is faster and thus the risk of overexposure decreases. Pixel skipping is cheaper to implement than pixel binning and requires less electronics.

The method may also comprise the step of comparing the exposure value with a predetermined minimum value, wherein the level of pixel binning and/or pixel skipping in the second read-out scheme is decreased compared to the first read-out scheme, if the exposure value is lower than the predetermined minimum value. This step takes care also of the problem to increase the exposure when the ambient light intensity decreases, such as when the digital image sensor device is moved from outdoors to indoors.

The level of pixel binning and/or pixel skipping of the first read-out scheme may be maintained in the second read-out scheme, if the exposure value is between the predetermined minimum value and the predetermined maximum value. Thus, when the intensity of the ambient light does not change the level of pixel binning and/or pixel skipping is maintained.

The step of determining an exposure value may comprise determining the maximum intensity value of any of the plurality of regions. This is one way of determining the exposure value. Alternative ways of determining an exposure value include determining the average intensity value of the plurality of regions, calculating an exposure value from the intensity values using a predetermined function of the intensity values, and determining the number of regions having an intensity value above a threshold value.

In one alternative, in the step of setting a second read-out scheme when the exposure value is higher than the predetermined maximum value, no more than one of the level of pixel binning and the level of pixel skipping is increased compared to the first read-out scheme.

Similarly, in the step of setting a second read-out scheme when the exposure value is lower than the predetermined minimum value, no more than one of the level of pixel binning and the level of pixel skipping is decreased compared to the first read-out scheme.

The method may also comprise the step of adding digital gain and/or offset for the intensity values. Thus, it is possible to fine tune the read-out in other ways than through pixel binning and pixel skipping. However, adding digital gain and/or offset for the intensity values can of course not avoid saturation of pixels or regions during read-out.

The images read from the digital image sensor device may preferably be used for eye tracking.

The method is especially useful when the digital image sensor device is configured with a rolling shutter and global reset. With such a digital image sensor device the problems are especially obvious.

According to a second aspect of the present invention a computer program for controlling read-out from a digital image sensor device is described. The computer program comprises instructions which, when executed by at least one processor cause the at least one processor to carry out the method according to the first aspect or any preferred embodiment thereof.

According to a third aspect of the present invention a computer-readable storage medium is provided, which comprises instructions which, when executed by at least one processor, cause the at least one processor to carry out the method according to the first aspect or any preferred embodiment thereof.

According to a fourth aspect of the present invention a system is provided comprising a digital image sensor device, comprising a plurality of pixels, and a processor configured to set a first read-out scheme, defining a first plurality of regions to be read based on a first level of pixel binning and/or pixel skipping, read, based on the first read-out scheme, from the digital image sensor device, a first image, comprising an intensity value of each one of the first plurality of regions of the first image, determine an exposure value for the first image, based on the intensity value of each one of the plurality of regions of the image, and compare the exposure value with a predetermined maximum value. The processor is also configured to set a second read-out scheme defining a second plurality of regions to be read based on a second level of pixel binning and/or pixel skipping, wherein the level of pixel binning and/or pixel skipping in the second read-out scheme is increased compared to the first read-out scheme, if the exposure value is higher than the predetermined maximum value; and read, based on the second read-out scheme, from the digital image sensor device, a subsequent second image comprising an intensity value of each one of the second plurality of regions of the second image.

The system according to the fourth aspect may be combined with any of the embodiment of the features of the first aspect with the same advantages as has been described for the first aspect or any of the embodiments of the first aspect.

In the following preferred embodiments of the invention will be described with reference to the appended drawings.

DETAILED DESCRIPTION

In the following description of preferred embodiments of the invention the same reference numeral will be used for the same feature in the different drawings.

Figure 1:
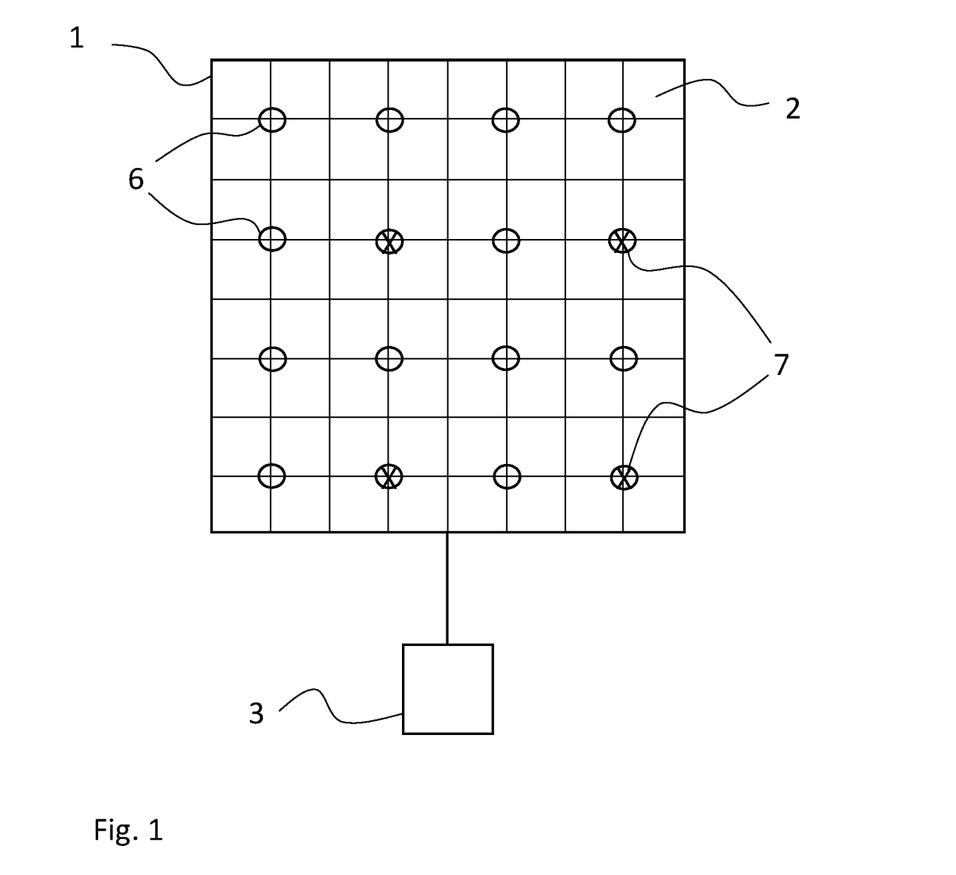
FIG. 1 shows schematically a system comprising a digital image sensor device, comprising a plurality of pixels, and a processor.
Figure 2:
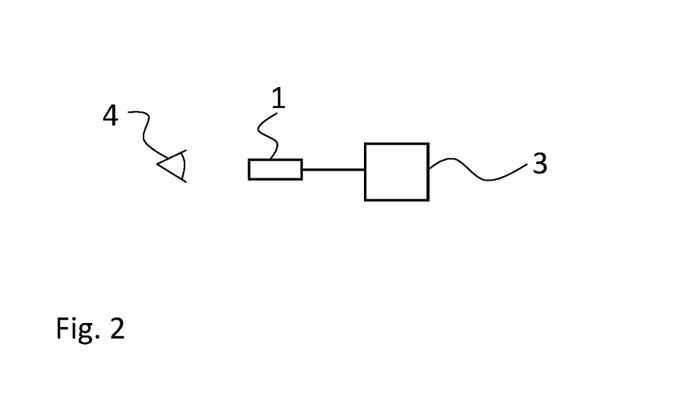
FIG. 2 shows schematically a system for eye scanning comprising a digital image sensor device.

FIG. 1 shows schematically a system comprising a digital image sensor device 1, comprising a plurality of pixels 2, and a processor 3. FIG. 2 shows schematically a system for eye scanning comprising a digital image sensor device 1, and a processor 3 in which a computer program is executed for controlling the digital image sensor device 1. The system shown in FIG. 2 can also be used for tracking the movement of an eye 4. The image sensor device 1 captures images of the eye 4 in order to track the movement of the eye. The pixels 2 may be read from the digital image sensor device using pixel binning and/or pixel skipping. The processor 3 is configured to set a first read-out scheme, defining a first plurality of regions 6 to be read based on a first level of pixel binning and/or pixel skipping. The processor 3 is then configured to read, based on the first read-out scheme, from the digital image sensor device 1, a first image, comprising an intensity value of each one of the first plurality of regions 6 of the first image. Pixel binning means that a plurality of regions 6 are defined which all comprise the same number of pixels 2. The intensity value for each region 6 is the mean pixel value for the pixels 2 in the respective region 6. In FIG. 1 the regions 6 consist of 2×2 pixels of the digital image sensor device as is indicated by the circles. The first read-out scheme may be based on no binning and no skipping, i.e., each region consists of only one pixel and each intensity value correspond to a respective pixel value. Also the first read-out scheme may of course comprise any level of pixel binning and/or pixel skipping. The processor 3 is then configured to determine an exposure value for the first image, based on the intensity value of each one of the plurality of regions of the image and to compare the exposure value with a predetermined maximum value. The exposure value may be determined to be the maximum intensity value of any of the plurality of regions. If, for example, the pixel value in the digital image sensor device can attain values between 0 and 255 the predetermined maximum value can be predetermined to be 254. If any region has an intensity value of 255 this is set at the exposure value. The exposure value of 255 means that a region has an intensity value of 255, which in turn means that the pixels in the region possibly are overexposed. The processor is configured to set a second read-out scheme defining a second plurality of regions to be read based on a second level of pixel binning and/or pixel skipping. In this embodiment the level of pixel binning is increased in the second read-out scheme compared to the first read-out scheme, and each region 6 consist of 2×2 pixels as is indicated by the circles in FIG. 1. The processor 3 is then configured to read, based on the second read-out scheme, from the digital image sensor device 1, a subsequent second image comprising an intensity value of each one of the second plurality of regions of the second image. This second image consist of 4×4 regions. The read-out time for the second image will be shorter than the read-out time for the first image. The shorter read-out time results in a lower exposure of each pixel, and thus also for each region. The second image will then comprise more information than the first image in which some regions where overexposed and thus had no relevant information for eye-tracking.

The digital image sensor device 1 may be configured with a rolling shutter and global reset. A global shutter means that all pixels 2 are reset at the same time. A rolling shutter means that the pixels are read subsequently while the pixels are still exposed. After reset of the pixels, each pixel starts to build up a pixel value reflecting the amount of light that hits each pixel. As the pixels/regions are read consecutively some pixels/regions are exposed longer than other pixels/regions.

The processor 3 constantly repeats the above described method. For eye-scanning images are read-out at a constant rate. Typically 2 to 1200 images per second are read-out in eye-scanning. The rate at which images are read-out does not have to be constant over time. For the above described second image an exposure value is determined, based on the intensity value of each one of the plurality of regions of the image. The exposure value is then compared with the predetermined maximum value. If the exposure value is still above the predetermined maximum value, pixel skipping is introduced as is illustrated by the crosses 7 in FIG. 1. Thus, only every second region 6 in every second region is read for the third image. In the described embodiment the first read image is read without any pixel skipping and pixel binning and has a size of 8×8 regions with an intensity value for each region. The second image is read using 2×2 pixel binning and comprises in total 4×4 regions. Finally, the third image is read out using 2×2 pixel binning and 2×2 pixel skipping and results in an image of the size 2×2 regions. The described embodiment is strongly simplified. In a practical embodiment the digital image sensor device typically comprises from 50×50 pixels to 50000×50000 pixels, preferably 200×200 pixels to 600×600 pixels, but it is of course possible to use any image sensor which allows pixel skipping and pixel binning. After start of the system images are read from the digital image sensor device with a predetermined level of binning/skipping, which level preferably is adapted to normal indoor illumination. The level of binning and/or skipping is then increased in steps to avoid saturation when the intensity of ambient light increases. The reason for the increase in ambient light might be that the user of the system moves outdoors.

Above it is described how the skipping and binning is increased to avoid saturation of the digital image sensor device. However, it may also be of interest to decrease the level of skipping and/or binning in order to raise the exposure of the pixels. The processor 3 may be configured also to compare the exposure value with a predetermined minimum value, wherein the level of pixel binning and/or pixel skipping in the second read-out scheme is decreased compared to the first read-out scheme, if the exposure value is lower than the predetermined minimum value. Finally, the processor 3 may be configured to maintain the level of pixel binning and/or pixel skipping of the first read-out scheme in the second read-out scheme, if the exposure value is between the predetermined minimum value and the predetermined maximum value. Thus, if the correct level of skipping and/or binning has been found and the intensity of the ambient light is constant the same level of skipping and/or binning may be used for the read-out of consecutive images.

Figure 3:
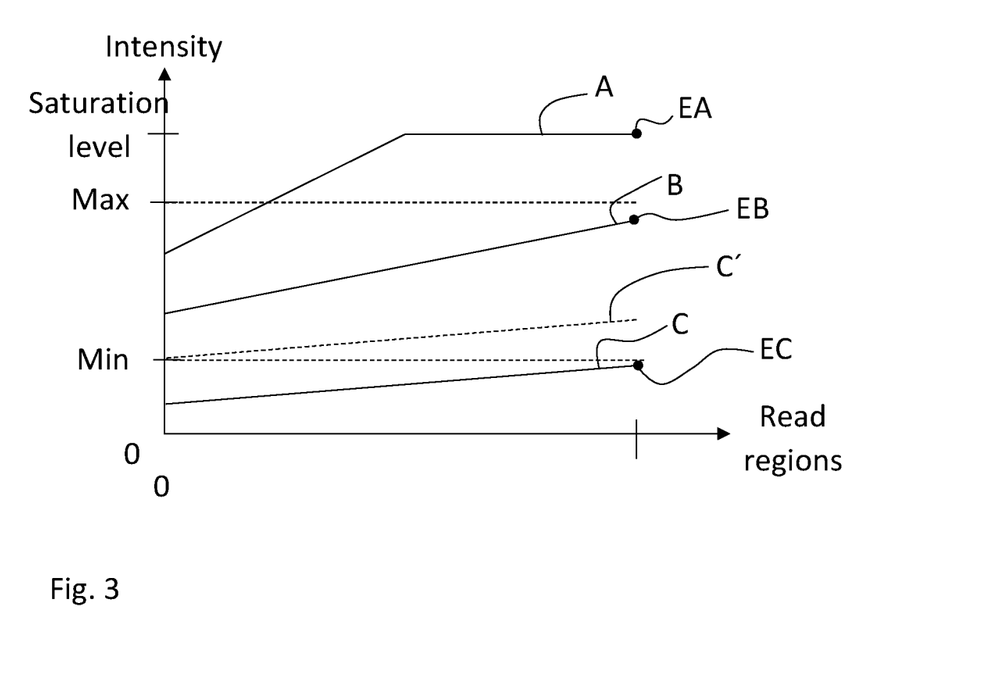
FIG. 3 illustrates how the intensity of the regions of an image may vary over time in the digital image, which may lead to saturation of some pixels/regions.

FIG. 3 illustrates how the intensity of the pixels/regions of an image may vary over the digital image due to different exposure time of each pixel/region, which may lead to saturation of some pixels/regions. In FIG. 3 the intensity values for the regions is shown as a function of pixels/regions, read one by one, when the digital image sensor device 1 is exposed by uniform brightness at all pixels/regions. Thus, theoretically the intensity should be a straight horizontal line. However, as described above the exposure time is longer for the pixels/regions read last during the read-out due to the rolling shutter and global reset. The curves A, B and C in FIG. 3 relate to different levels of pixel binning and/or pixel skipping as illustrated in FIG. 1. For curve A no pixel skipping or pixel binning is used. This requires such a long time for read-out that about half of the pixels/regions are saturated. Also shown in FIG. 3 is a predetermined maximum level Max for any region. In FIG. 3 the region having the highest intensity is determined as the exposure value EA, EB, EC. The exposure value EA, EB, EC for the respective curves A, B, C is indicated with a dot in FIG. 3. The exposure value is then compared with a predetermined maximum value Max and with a predetermined minimum value Min. For curve A the exposure value EA is higher than the predetermined maximum value Max. Consequently, during the next read-out scheme, the level of pixel binning and/or pixel skipping will be increased to avoid saturation of pixels/regions. Curve B relates to the level of pixel binning discussed above for FIG. 1 where the circles illustrate the regions 6. The exposure value EB for curve B is lower than the predetermined maximum level and higher than the predetermined minimum level. The exposure level for curve B is acceptable and the read-out scheme for curve B may be maintained for the subsequent read-out, i.e., the level of pixel binning and/or pixel skipping will remain the same during the subsequent read-out. Finally, curve C corresponds in this example to the level of pixel binning and pixel skipping illustrated with the crosses 7 in FIG. 1. The exposure value EC for curve C is below the predetermined minimum value Min. Thus, the processor 3 would decrease the level of pixel binning and/or pixel skipping in the subsequent read-out to arrive at curve B.

It is of course possible to determine the exposure value in other ways than by determining the highest intensity value. One alternative is to determine the exposure value as the average intensity value of the plurality of regions. Another alternative is to determine the exposure value by calculating an exposure value from the intensity values using a predetermined function of the intensity values. Another alternative is to determine the exposure value by determining the number of regions having an intensity value above a threshold value.

As an addition to increasing and/or decreasing the level of binning skipping it is possible to add digital gain and/or offset for the intensity values. This is illustrated in FIG. 3 with curve C', which illustrates how digital gain has been used to translate curve C upwards in FIG. 3.

As is evident from FIG. 3 the problem with saturation or underexposure is most relevant for images comprising a large number of pixels.

Figure 4:
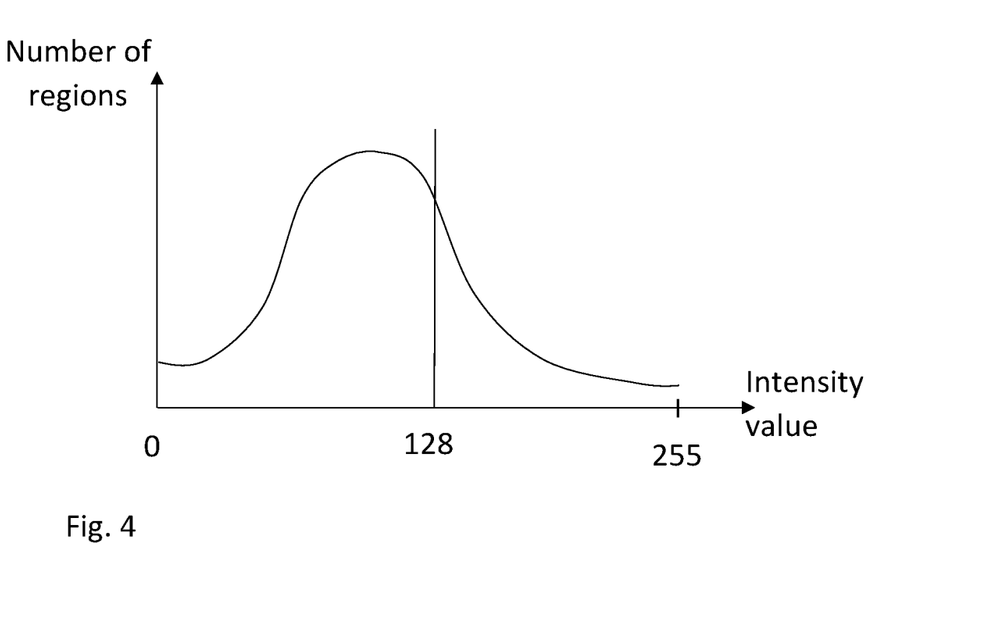
FIG. 4 illustrates an alternative method for determining the exposure value.

FIG. 4 illustrates an alternative method for determining the exposure value. The diagram in FIG. 4 shows the number of regions in the image for each intensity value. In this alternative method, the exposure value is defined as a ratio of regions having an intensity value above a predetermined threshold. In this example the threshold is illustrated as being an intensity value of 128.

Figure 5:
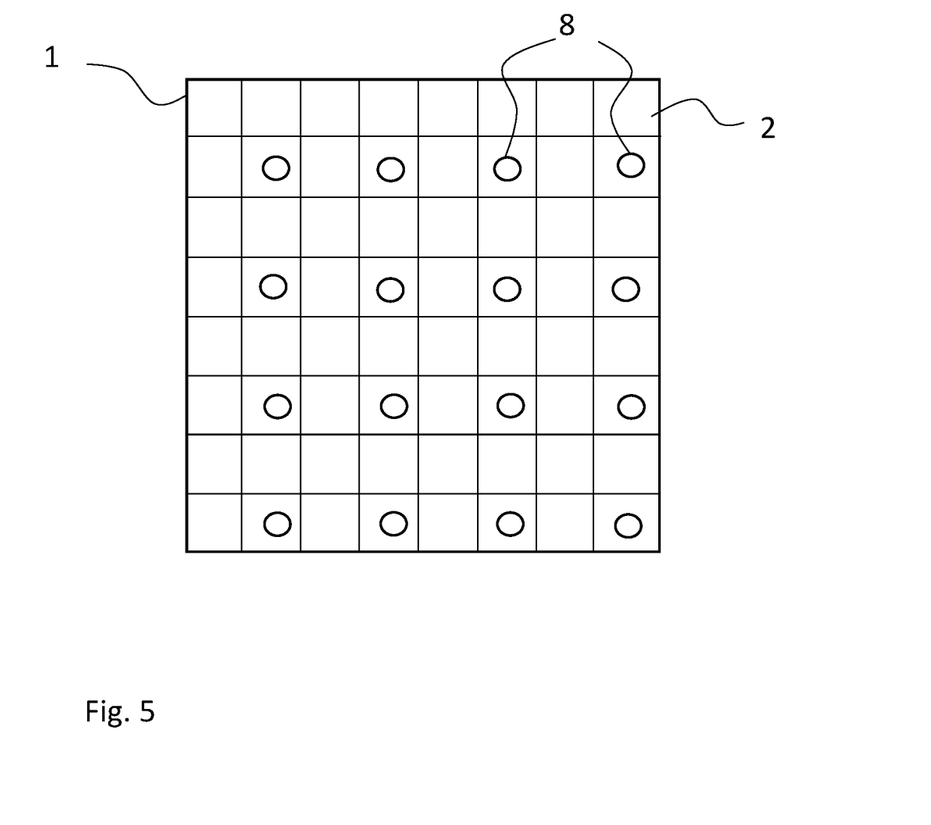
FIG. 5 illustrates schematically pixel skipping.

FIG. 5 illustrates schematically pixel skipping. The digital image sensor device 1 comprises 8×8 pixels 2. Skipping is applied during read-out so that only every second pixel 2 on every second row is read as is illustrated by the circles 8.

Figure 6:
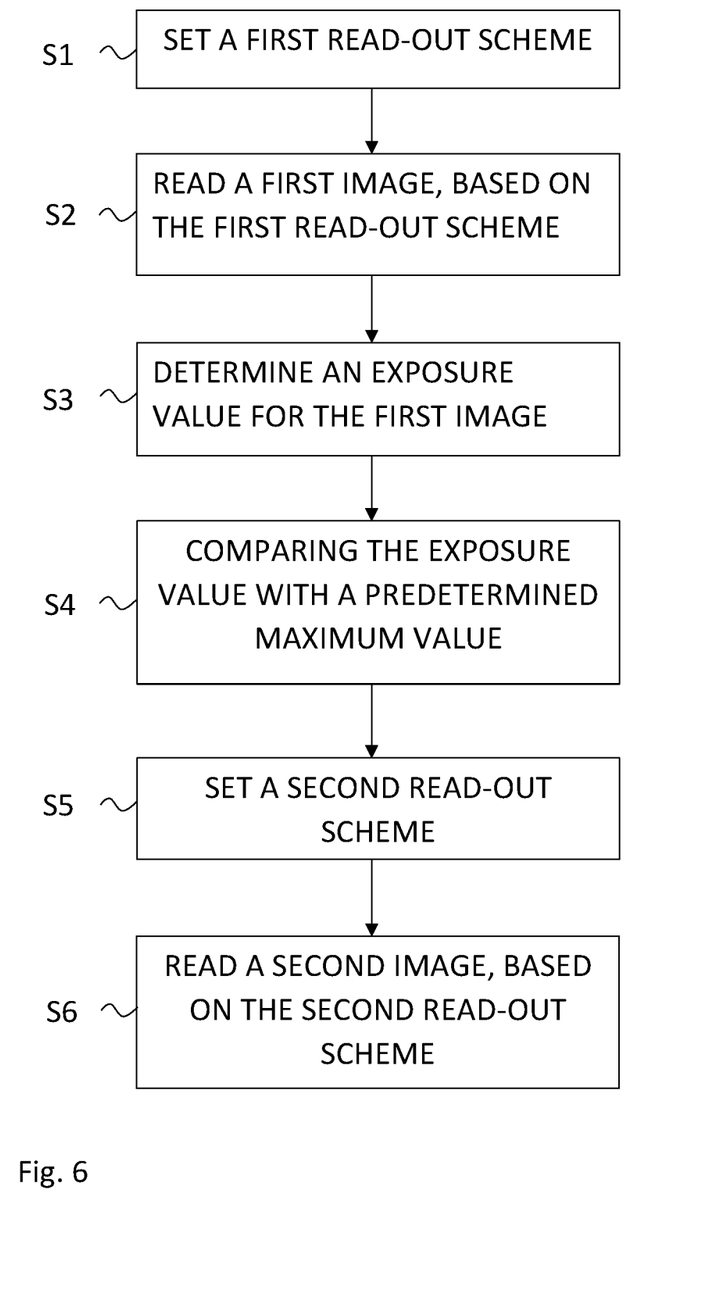
FIG. 6 illustrates a computer implemented method according to the invention, for controlling read-out from a digital image sensor device.

FIG. 6 illustrates a computer implemented method which can be performed by the processor 3, for controlling read-out from the digital image sensor device. The method comprises a first step of setting 51 a first read-out scheme, defining a first plurality of regions 6, 7, 8 to be read based on a first level of pixel binning and/or pixel skipping. Further, the method comprises a second step of reading S2, based on the first read-out scheme, from the digital image sensor device 1, a first image, comprising an intensity value of each one of the first plurality of regions 6, 7, 8 of the first image. Yet further, the method comprises a third step of determining S3 an exposure value for the first image, based on the intensity value of each one of the first plurality of regions 6, 7, 8 of the first image. The method comprises a fourth step of comparing S4 the exposure value with a predetermined maximum value. Further, the method comprises a fifth step of setting S5 a second read-out scheme defining a second plurality of regions 6, 7, 8 to be read based on a second level of pixel binning and/or pixel skipping, wherein the level of pixel binning and/or pixel skipping in the second read-out scheme is increased compared to the first read-out scheme, if the exposure value is higher than the predetermined maximum value. Yet further, the method comprises a sixth step of reading S6, based on the second read-out scheme, from the digital image sensor device 1, a subsequent second image, comprising an intensity value of each one of the second plurality of regions of the second image.

The above described embodiments may be amended in many ways without departing from the scope of the present invention, which is limited only by the appended claims.

The invention claimed is:

1. A computer implemented method for controlling read-out from a digital image sensor device, comprising a plurality of pixels, the method comprising the steps of:
    setting a first read-out scheme, defining a first plurality of regions to be read based on a first level of pixel binning and/or pixel skipping,
    reading, based on the first read-out scheme, from the digital image sensor device, a first image, comprising an intensity value of each one of the first plurality of regions of the first image,
    determining an exposure value for the first image, based on the intensity value of each one of the first plurality of regions of the first image,
    comparing the exposure value with a predetermined maximum value,
    setting a second read-out scheme defining a second plurality of regions to be read based on a second level of pixel binning and/or pixel skipping, wherein the level of pixel binning and/or pixel skipping in the second read-out scheme is increased compared to the first read-out scheme, if the exposure value is higher than the predetermined maximum value;
    reading, based on the second read-out scheme, from the digital image sensor device, a subsequent second image, comprising an intensity value of each one of the second plurality of regions of the second image, and;
    comparing the exposure value with a predetermined minimum value, wherein the level of pixel binning and/or pixel skipping in the second read-out scheme is decreased compared to the first read-out scheme, if the exposure value is lower than the predetermined minimum value.

2. The method according to claim 1, wherein the level of pixel binning and/or pixel skipping of the first read-out scheme is maintained in the second read-out scheme, if the exposure value is between the predetermined minimum value and the predetermined maximum value.

3. The method according to claim 1, wherein the step of determining an exposure value comprises determining the maximum intensity value of any of the plurality of regions.

4. The method according to claim 1, wherein the step of determining an exposure value comprises determining the average intensity value for the plurality of regions.

5. The method according to claim 1, wherein the step of determining an exposure value comprises calculating an exposure value from the intensity values using a predetermined function of the intensity values.

6. The method according to claim 1, wherein the step of determining an exposure value comprises determining the number of regions having an intensity value above a threshold value.

7. The method according to claim 1, wherein, in the step of setting a second read-out scheme when the exposure value is higher than the predetermined maximum value, no more than one of the level of pixel binning and the level of pixel skipping is increased compared to the first read-out scheme.

8. The method according to claim 1, wherein, in the step of setting a second read-out scheme when the exposure value is lower than the predetermined minimum value, no more than one of the level of pixel binning and the level of pixel skipping is decreased compared to the first read-out scheme.

9. The method according to claim 1, comprising the step of adding digital gain and/or offset for the intensity values.

10. The method according to claim 1, wherein the images are used for eye tracking.

11. The method according to claim 1, wherein the digital image sensor device is configured with a rolling shutter and global reset.

12. A non-transitory computer-readable storage medium storing a computer program for controlling a digital image sensor device, the computer program comprising instructions which, when executed by at least one processor cause the at least one processor to carry out the steps of:
    setting a first read-out scheme, defining a first plurality of regions to be read based on a first level of pixel binning and/or pixel skipping,
    reading, based on the first read-out scheme, from the digital image sensor device, a first image, comprising an intensity value of each one of the first plurality of regions of the first image, determining an exposure value for the first image, based on the intensity value of each one of the first plurality of regions of the first image, comparing the exposure value with a predetermined maximum value, setting a second read-out scheme defining a second plurality of regions to be read based on a second level of pixel binning and/or pixel skipping, wherein the level of pixel binning and/or pixel skipping in the second read-out scheme is increased compared to the first read-out scheme, if the exposure value is higher than the predetermined maximum value;

reading, based on the second read-out scheme, from the digital image sensor device, a subsequent second image, comprising an intensity value of each one of the second plurality of regions of the second image, and;

comparing the exposure value with a predetermined minimum value, wherein the level of pixel binning and/or pixel skipping in the second read-out scheme is decreased compared to the first read-out scheme, if the exposure value is lower than the predetermined minimum value.

13. A system comprising a digital image sensor device, comprising a plurality of pixels, and a processor configured to:

set a first read-out scheme, defining a first plurality of regions to be read based on a first level of pixel binning and/or pixel skipping, read, based on the first read-out scheme, from the digital image sensor device, a first image, comprising an intensity value of each one of the first plurality of regions of the first image, determine an exposure value for the first image, based on the intensity value of each one of the plurality of regions of the image, compare the exposure value with a predetermined maximum value, set a second read-out scheme defining a second plurality of regions to be read based on a second level of pixel binning and/or pixel skipping, wherein the level of pixel binning and/or pixel skipping in the second read-out scheme is increased compared to the first read-out scheme, if the exposure value is higher than the predetermined maximum value;

read, based on the second read-out scheme, from the digital image sensor device, a subsequent second image comprising an intensity value of each one of the second plurality of regions of the second image, and;

comparing the exposure value with a predetermined minimum value, wherein the level of pixel binning and/or pixel skipping in the second read-out scheme is decreased compared to the first read-out scheme, if the exposure value is lower than the predetermined minimum value.

* * * * *